Sept. 24, 1963       G. M. BONNETT              3,104,963
                  MOISTURE SEPARATOR APPARATUS
Filed Sept. 29, 1960                        2 Sheets-Sheet 1

INVENTOR
GEORGE M. BONNETT

BY Shoemaker and Mattare

ATTORNEYS

Sept. 24, 1963   G. M. BONNETT   3,104,963
MOISTURE SEPARATOR APPARATUS
Filed Sept. 29, 1960   2 Sheets-Sheet 2

INVENTOR
*GEORGE M. BONNETT*

BY *Shoemaker and Mattare*

ATTORNEYS

_United States Patent Office_

3,104,963
Patented Sept. 24, 1963

1

3,104,963
MOISTURE SEPARATOR APPARATUS
George M. Bonnett, Newport News, Va., assignor to Newport News Shipbuilding and Dry Dock Company, Newport News, Va., a corporation of Virginia
Filed Sept. 29, 1960, Ser. No. 59,367
7 Claims. (Cl. 55—332)

The present invention relates to a new and novel moisture separator apparatus, and more particularly to apparatus for quickly removing condensed water droplets from a stream of steam.

The present invention may, of course, be used in various applications wherein it is desired to remove moisture from a flowing stream and has particular utility in separating out condensed water droplets from a stream of steam.

The problem of removing moisture from a stream of steam becomes particularly acute in relatively low temperature operations wherein there is, of course, a greater tendency for the water to condense. For example, in nuclear powered ships, a nuclear reactor is employed for generating the steam for driving the propulsion and auxiliary turbines. Due to certain inherent characteristics of such reactors, the steam temperatures are relatively low, and as a result, a considerable amount of water may condense into water droplets as the steam is being directed to the turbines. It is, of course, important to remove such water droplets prior to the entry of steam into the turbines. Since the water droplets in this type of installation are already condensed, the moisture separator apparatus does not need to perform a condensing action, but rather must be of such a construction as to effectively remove the already condensed water droplets.

Such collection of the water droplets is accomplished in the present invention by causing the stream of steam to impinge upon the outer surface of the moisture collecting means, and to cause a change of direction at such moisture collecting means. By providing a tapered or conical configuration to the moisture collector assembly, and further by providing an inlet which directs the steam toward the apex of the assembly while the outlets are directed normally to the inlet, the steam must change direction approximately 90 degrees and is deflected off of the collector assembly in doing so.

With this arrangement, the steam will more or less readily change direction, while the much heavier water droplets tend to continue in their original path of movement due to the force of inertia. This causes the water droplets to impinge upon the surface of the collector assembly. The collector assembly is provided with means for quickly removing any water droplets collected on the surface thereof and directing such moisture away from the collector assembly.

This is important since there is a strong possibility that such water droplets will be re-entrained in the stream of steam if the water droplets are not removed shortly after being deposited on the surface of the collector assembly.

In addition, the collector assembly of the present invention is particularly designed so as to permit ready assembly and disassembly thereof for cleaning and replacement of parts as necessary, and accordingly, a very simple and compact overall arrangement is provided.

The purposes of the present invention are accomplished by providing a collector assembly including a plurality of collector members which are stacked one upon the other to define an outer configuration which is substantially conical. This, of course, provides the desired deflection and assists in changing the direction of the steam stream.

2

The various collector members are maintained in stacked relationship by a clamping means in the form of an elongated bolt-like member having an enlarged tapered head at one end thereof which overlies the various collector members. The upper peripheral edges of the various collector members are spaced outwardly of the lower peripheral edge of the member immediately thereabove, thereby defining a plurality of spaced annular openings or grooves. As a result, when the water droplets are deposited on the outer surfaces of the various members, they tend to flow downwardly along such outer surfaces under the influence of the stream of steam and assisted by gravity.

In order to ensure that such moisture is quickly removed so that it can not be again blown into the stream of steam, the annular spaces or grooves are provided at stepped intervals along the outer surface of the collector assembly to remove such moisture. The construction is further such that once said moisture has passed inwardly into the grooves, it is impossible for the stream of steam to then subsequently cause the moisture to be re-entrained into the stream. The various collector members are keyed to the clamping bolt means while the lowermost collector member is pinned to the enclosing body means such that the entire structure is held in a rigid relationship and the various members can not rotate with respect to one another. This construction further permits ready assembly and disassembly of the components as desired.

An object of the present invention is to provide a new and novel moisture separator apparatus including a collector assembly which deflects a stream of steam to assist in changing the direction thereof, and removes moisture from such stream.

Another object is to provide a moisture separator apparatus wherein the moisture is quickly removed from the surfaces of the collector assembly to prevent re-entrainment of the moisture in the stream of steam.

A further object of the invention is to provide a moisture separator apparatus which can be quickly and easily assembled and disassembled.

A still further object of the invention is the provision of a moisture separator apparatus which is quite simple, inexpensive and compact in construction, and yet which is quite sturdy and reliable in operation.

Other objects and many attendant advantages of the present invention will become more apparent when considered in connection with the specification and accompanying drawings, wherein.

Figure 1:
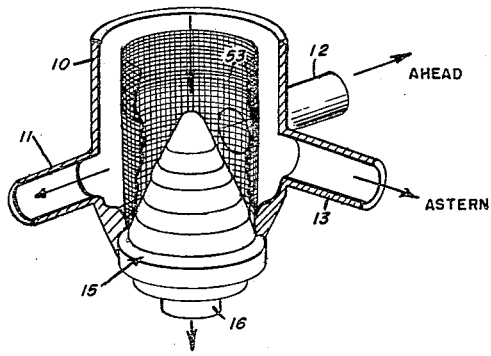
FIG. 1 is a somewhat schematic perspective broken-away view illustrating the disposition of the moisture separator apparatus in a steam distributing system.

Referring now to the drawings wherein like reference characters designate corresponding parts throughout the several views, FIG. 1 illustrates in general a portion of a steam distributing system wherein the flow of steam is indicated schematically by the arrows. The steam flows in through an inlet conduit 10, and thence outwardly through a pair of diametrically opposite outlet conduits 11 and 12 and a third outlet conduit 13.

It will be noted that the outlet conduits 11, 12 and 13 extend substantially normally to the inlet conduit 10. In a typical installation, the steam from the nuclear reactor is conducted through the inlet conduit 10, and thence outwardly through outlet conduits 11 and 12 to the turbines for driving the ship in a forward direction. Steam passing through the outlet conduit 13 may be utilized for driving the ship in a reverse direction.

The moisture separator apparatus itself is indicated generally by the arrow 15 in FIG. 1, it being noted that the moisture separator apparatus itself has a generally conical outer configuration which assists in deflecting the stream of steam, and which provides a surface upon which the water droplets tend to impinge due to their impetus in the stream of steam. An outlet or drain portion is indicated at 16 through which the removed moisture is drained away from the outlet conduits.

Figure 2:
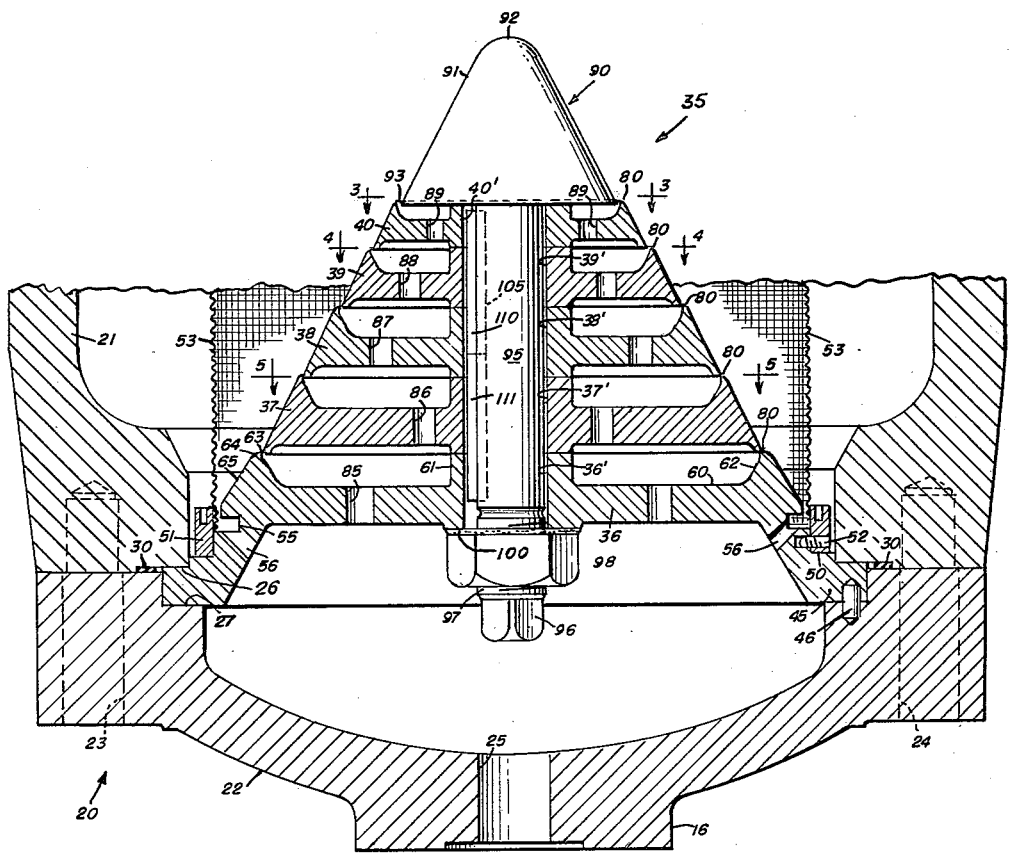
FIG. 2 is a longitudinal section partially broken away through the collector assembly of the apparatus.

Referring now to FIG. 2 of the drawings, the body means which houses the moisture separator apparatus is indicated generally by reference numeral 20 and includes a main hollow body portion 21 and a lower cover portion 22, the main body portion 21 and cover 22 being connected by suitable bolt means indicated at 23 and 24. It will be noted that the cover means 22 is provided with a central drain opening 25 through which the collected moisture is removed from the apparatus through a steam trap or similar device.

It will be noted that a small annular recessed portion 26 is provided at the lower portion of main body portion 21 and a larger annular recessed portion 27 is provided at the upper inner portion of the cover member 22. It will be apparent that an annular space is thereby provided between the body portion 21 and the cover 22 for a purpose hereinafter described. In addition, an annular sealing gasket 30 is provided between the main body portion 21 and the cover 22.

The collector assembly is indicated generally by reference numeral 35, and is composed of a plurality of collector members which are stacked upon one another.

It will be evident that any number of collector members may be employed as desired and in the present example, five such collector members 36, 37, 38, 39 and 40 are employed. Each of these collector members is substantially circular in plan configuration, and the outer peripheries thereof are substantially frusto-conical in configuration as will be readily apparent from an inspection of FIG. 2. It will also be noted that the collector members are provided with central openings 36', 37', 38', 39' and 40' respectively.

The lowermost collector member 36 is provided at the lower outer portion thereof with a radially outwardly extending annular flange portion 45 which is received in the space defined between the main body portion 21 and the cover member 22, this flange portion 45 being tightly clamped in such position. A pin 46 is tightly fitted in aligned openings provided in the cover portion 22 and the flange 45 of the lowermost collector member which prevents relative rotation between member 36 and the body means.

An annular shoulder portion 50 is provided on the outer surface of the lower collector member 36 and an annular supporting ring 51 is disposed on this shoulder portion 50. The supporting ring 51 is positively held in position by a plurality of screws 52 which extend through aligned openings in the ring and the collector member. These screws may for example be four in number, only one of such screws being shown in FIG. 2. A substantially cylindrical screen member 53 is secured as by spot welding to the supporting ring 51, screen member 53 extending upwardly from the supporting ring and in surrounding relationship to the collector assembly 35.

An inwardly extending annular groove 55 is also formed in the outer surface of the lower collector member 36 and a plurality of diagonally extending holes 56 which may for example be eight in number are formed through the side wall of the collector member to provide communication from the radial groove 55 to the under surface of the collector member. It will, of course, be noted that the under surface of the collector member 36 is recessed in the central portion thereof to provide a substantially dished-out under surface.

It will also be noted that a dished-out portion 60 is provided in the upper surface of collector member 36 while a central annular collar portion 61 is provided. It will be noted that the dished-out upper portion 60 tapers upwardly to provide an inclined surface 62 which terminates in an upper peripheral edge 63 which is connected by means of a small arcuate portion 64 with the substantially frusto-conically shaped outer surface 65.

Figure 7:
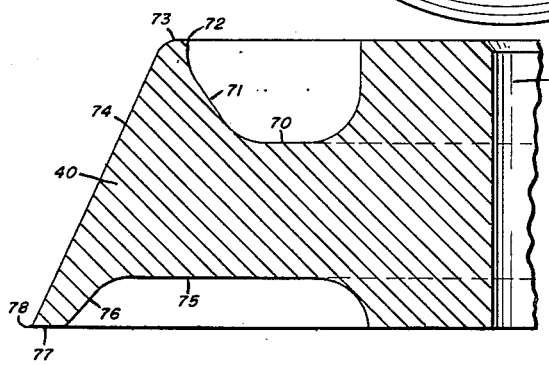
FIG. 7 is an enlarged sectional view of a portion of one of the collector members of the assembly.

Each of the collector members 37, 38, 39 and 40 are of similar configuration, it being noted that each of the collector members is progressively of lesser diameter as they proceed toward the upper portion of the collector assembly. Taking the uppermost collector member 40 as a typical example, the configuration of the various collector members may be more clearly understood from an inspection of FIG. 7, wherein it is noted that a dished-out portion 70 is provided in the upper surface of member 40, this dished-out portion 70 including an inclined surface 71 which terminates in a sharp edge portion 72. This sharp edge portion is connected by arcuate portion 73 with the downwardly extending substantially frusto-conical outer surface 74. The lower surface of the member is also dished out at 75, this dished-out portion including a sloping surface 76 which joins with an annular under surface 77 which in turn terminates at a sharp lower outer peripheral edge 78.

Referring again to FIG. 2, it will be noted that the dimensions of the various collector members are such that the upper peripheral edge of each collector member is spaced outwardly of the lower peripheral edge of the collector member thereabove, and in this manner, a plurality of annular grooves 80 are provided between the adjacent members, these annular grooves serving to receive any moisture on the outer surfaces of the collector members and which flows downwardly therealong.

It becomes apparent that the moisture is collected in the recessed upper portions of each of the collector members. This collected moisture then passes downwardly through holes provided through each of the collector members. Members 36–40 are provided respectively with holes 85, 86, 87, 88 and 89 through which the moisture may pass downwardly from collector member to collector member and thence finally into the dished-out portion of the cover member 22 and out through the drain opening 25. Since the various collector members are of different dimensions, they may be provided with a different number of openings as desired. For example, member 40 may have four openings, member 39 may have six openings, member 38 may have eight openings, member 37 may have ten openings, and member 36 may have twelve openings. These last-mentioned openings formed through the various collector members are preferably offset with respect to one another as shown.

The collector members are held in clamped operative relationship to one another by means of a clamping means indicated generally by reference numeral 90. This clamping means includes an enlarged upper head portion 91, which has a rounded apex 92 and an outer configuration which is substantially conical. It will be noted that the lower peripheral edge 93 of the enlarged head portion 91 is spaced inwardly from the adjacent upper peripheral edge of member 40 such that any moisture collected on the outer surface of enlarged head 91 will flow downwardly into the recessed upper portion of collector member 40.

It will, of course, be noted that the inner annular portions of each of the collector members rest upon one another such that they can be stacked in the proper operative relationship, and the enlarged head portion 91 of the clamping means rests upon the inner collar portion of the uppermost collector member 40 as seen. The clamping means 90 also includes a downwardly extending substantially cylindrical shank 95 which extends through the various central openings in the collector members and terminates in a lower end portion 96 which has flat side faces such that the end portion may be substantially square, these flat faces assisting in gripping the clamping means for assembly and disassembly purposes. The portion 97 directly above the lowermost end portion 96 is threaded for receiving a nut 98 which is adapted to initially clamp the collector members in position.

If it is desired to fixedly secure nut 98 in the operative position shown, a weld 100 may be formed between nut 98 and the adjacent surface of the lower collector member 36.

Figure 3:
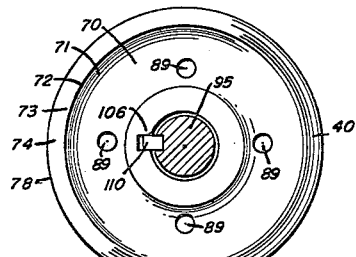
FIG. 3, FIG. 4 and FIG. 5 are sectional views taken along lines 3—3, 4—4 and 5—5 of FIG. 2 looking in the direction of the arrows.
Figure 4:
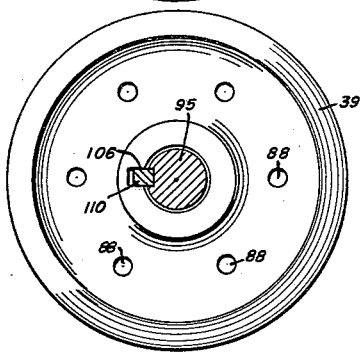
Figure 6:
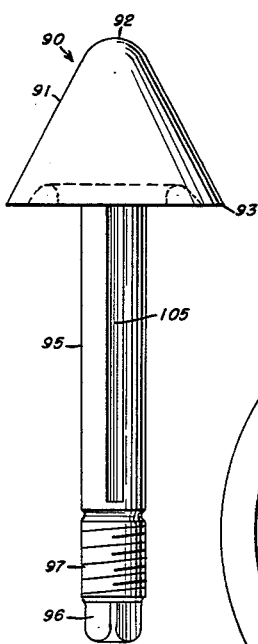
FIG. 6 is an elevational view of the clamping bolt means of the assembly.
Figure 5:
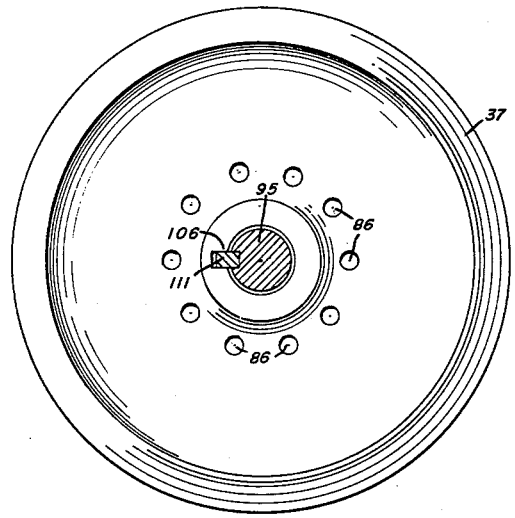

As seen particularly in FIG. 6, the clamping bolt 90 is provided with an elongated longitudinally extending slot 105. As seen in FIGS. 3–5, each of the collector members is provided with slots indicated by reference numerals 106 which are adapted to be aligned with elongated slot 105. As seen in FIG. 2, a pair of keys 110 and 111 are disposed in the aligned slots 106 and 105 formed in the collector members and the clamping bolt means, these key members serving to prevent relative rotation between the various collector members and the surrounding body means.

It is apparent from the foregoing that there is provided a new and novel collector assembly having a tapered or substantially conical configuration which assists in deflecting and changing the direction of a stream of steam and which effectively removes moisture from the stream. The moisture which is accumulated on the surfaces of the various collector portions is quickly removed from such surfaces by providing a plurality of spaced annular grooves which receive such moisture.

It is evident that assembly and disassembly of the apparatus may be accomplished in a very simple manner. The overall structural arrangement is quite simple, inexpensive and compact, and yet at the same time, the apparatus is quite reliable and effective in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Moisture separator apparatus comprising a hollow body means having a drain opening formed therethrough, a moisture collector assembly disposed within said hollow body means and having a substantially conical configuration with a closed upper apex portion, said assembly comprising a plurality of collector members disposed in stacked relationship one upon the other, adjacent ones of said collector members being spaced from one another to define a plurality of continuous upwardly facing annular openings for collecting moisture, said collector members having holes formed therethrough to allow the collected moisture to be conducted to said drain opening, and means for directing an incoming stream of steam toward the apex portion of said conical collector assembly in a direction substantially parallel with the axis of the collector assembly.

2. A moisture separator apparatus comprising a hollow body means having a drain opening formed in a portion thereof, a moisture collector assembly disposed within said hollow body means and having a tapered configuration with a closed upper apex portion, said moisture collector assembly comprising a plurality of collector members supported adjacent one another, each of said collector members having a substantially frusto-conical shaped outer surface, certain ones of said collector members having the upper peripheral edge thereof spaced outwardly of the lower peripheral edge of the collector member immediately thereabove to thereby define continuous annular collector spaces between the adjacent collector members, said collector members having openings formed through the bottom portions thereof to allow moisture collected through said collector spaces to communicate with said drain opening, and means for directing an incoming stream of steam toward the apex portion of said tapered collector assembly in a direction substantially parallel with the axis of the collector assembly.

3. Moisture separator apparatus comprising a body means, said body means including a main body portion and a removable cover portion, said cover portion having a drain opening formed therethrough, a moisture collector assembly disposed within said body means and overlying said drain openings, said moisture collector assembly comprising a plurality of collector members disposed in stacked relationship one upon the other, the lowermost one of said collector members being non-rotatably secured to said body means so as to prevent rotation therebetween, means for preventing relative rotation between said lowermost collector member and the remaining collector members, each of said collector members having a substantially frusto-conically shaped outer surface, the upper peripheral edges of the collector members other than the uppermost collector member having the upper peripheral edges thereof spaced outwardly of the lower peripheral edge of the collector member immediately thereabove to define continuous annular collector spaces therebetween, said collector members having holes formed therethrough for providing communication with said drain opening, said collector assembly defining a substantially conical configuration with a closed upper apex portion, and means for directing an incoming stream of steam toward the apex portion of said conical collector assembly in a direction substantially parallel with the axis of the collector assembly.

4. Apparatus as defined in claim 3 including a clamping means for clamping said collector members in operative position, said clamping means including an enlarged head of tapered configuration formed at the upper end thereof above said collector members.

5. Apparatus as defined in claim 4, wherein said clamping means includes an elongated shank, said collector members having central openings formed therethrough, said elongated shank extending through said openings, the lower end of said shank being threaded, and nut means threaded on said lower end for clamping the assembly in operative position.

6. Moisture separator apparatus comprising a hollow body means including a main body portion and a separable cover portion, said cover portion having a drain opening formed therethrough, a moisture collector assembly operably mounted within said body means and including a plurality of collector members stacked one upon the other to define a generally tapered configuration, each of said collector members having an outer surface of substantially frusto-conical configuration, pin means connected between the lowermost collector member and said body means for preventing relative rotation therebetween, each of said collector members having a central opening formed therethrough, a clamping means including an enlarged upper head portion of tapered configuration and an elongated shank, said elongated shank extending through said openings, means keying said collector members to said shank for preventing relative rotation between said collector members, the lower end of said shank being threaded, nut means threadedly mounted on said threaded end for clamping said collector members in operative position, means fixedly securing said nut means in position, each of said collector members having a recessed central portion and a raised upper peripheral edge portion, the upper peripheral edge portion of each of said collector members being spaced outwardly of the lower peripheral edge portion of the collector member immediately thereabove to define a plurality of spaced continuous annular openings to permit moisture on the outer surfaces of said collector members to flow into the recessed portion of the collector members therebelow, said collector members having openings formed therethrough in communication with said recessed portion for allowing collected moisture to pass downwardly to said drain opening.

7. Apparatus as defined in claim 6, including an annular screen supporting ring supported by said lowermost collector member and a screen means supported by said ring and extending upwardly and in surrounding relationship to said collector assembly.

References Cited in the file of this patent
UNITED STATES PATENTS

| | | |
|---|---|---|
| 166,040 | Thornton | July 27, 1875 |
| 532,296 | Sweet | Jan. 8, 1895 |
| 2,074,505 | Goldstein | Mar. 23, 1937 |